United States Patent
Goetz et al.

(10) Patent No.: US 11,704,691 B1
(45) Date of Patent: *Jul. 18, 2023

(54) METHODS AND SYSTEM FOR PROVIDING ATM NON-CUSTOMER LEAD INFORMATION

(71) Applicant: Wells Fargo Bank, N.A., San Francisco, CA (US)

(72) Inventors: Darren Goetz, Salinas, CA (US); Nahal Agahi, San Francisco, CA (US); Alicia Moore, San Ramon, CA (US); Elizabeth Schrag, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/365,806

(22) Filed: Jul. 1, 2021

Related U.S. Application Data

(63) Continuation of application No. 14/305,612, filed on Jun. 16, 2014, now Pat. No. 11,055,738.

(51) Int. Cl.
    *G06Q 30/02*      (2023.01)
    *G06Q 30/0251*    (2023.01)
    *G06Q 20/10*      (2012.01)

(52) U.S. Cl.
    CPC ..... *G06Q 30/0251* (2013.01); *G06Q 20/1085* (2013.01)

(58) Field of Classification Search
    None
    See application file for complete search history.

(56) References Cited

U.S. PATENT DOCUMENTS 5,930,764 A    7/1999  Melchione et al.
6,026,382 A    2/2000  Kalthoff
                       (Continued)

FOREIGN PATENT DOCUMENTS

EP    1 085 476 A2    3/2001

OTHER PUBLICATIONS

Carlson, H. (1994). Banks plunge into growing ATM market. Springfield Business Journal, 14(41), 1. Retrieved from https://dialog.proquest.com/professional/docview/205944129?accountid=131444 on Feb. 23, 2023 (Year: 1994).*

(Continued)

*Primary Examiner* — Kito R Robinson
(74) *Attorney, Agent, or Firm* — Foley & Lardner LLP

(57) ABSTRACT

Systems and methods for obtaining non-customer lead information include authenticating a user at an ATM for a transaction via biometric information, determining that the user is a non-customer of a financial institution operating the ATM, determining that the user was a customer of the financial institution prior to becoming a non-customer, presenting an offer to the non-customer on the ATM based in part on the non-customer lead information collected from an at least one previous transaction with the user, where, responsive to the determination that the user was a customer of the financial institution operating the ATM prior to becoming a non-customer, the offer further comprises a message to the user indicative of the user being a former customer, receiving a response from the non-customer relating to the offer presented, transferring the response to the financial institution computing system.

20 Claims, 5 Drawing Sheets

(56) References Cited

U.S. PATENT DOCUMENTS

| | | | |
|---|---|---|---|
| 7,421,410 B1 * | 9/2008 | Schechtman | G06Q 20/105 705/41 |
| 7,739,197 B2 | 6/2010 | Jambunathan et al. | |
| 7,822,684 B2 | 10/2010 | Rielly et al. | |
| 7,930,411 B1 | 4/2011 | Hayward | |
| 8,556,164 B1 | 10/2013 | Freedman et al. | |
| 2001/0029528 A1 * | 10/2001 | Coutts | G06Q 30/0601 705/26.1 |
| 2002/0032656 A1 | 3/2002 | Chen | |
| 2002/0112178 A1 | 8/2002 | Scherr | |
| 2002/0152394 A1 | 10/2002 | Kadoya | |
| 2003/0040959 A1 | 2/2003 | Fei et al. | |
| 2003/0046231 A1 | 3/2003 | Wu | |
| 2003/0217005 A1 | 11/2003 | Drummond et al. | |
| 2004/0135801 A1 * | 7/2004 | Thompson | G06Q 40/128 715/702 |
| 2007/0181674 A1 | 8/2007 | Taylor et al. | |
| 2008/0086376 A1 | 4/2008 | Rothkopf | |
| 2010/0063890 A1 * | 3/2010 | Huckleby | G06Q 30/02 705/26.1 |
| 2011/0231258 A1 | 9/2011 | Winters | |
| 2012/0303448 A1 | 11/2012 | Psillas et al. | |
| 2014/0180826 A1 | 6/2014 | Boal | |
| 2015/0269594 A1 | 9/2015 | Provost et al. | |

OTHER PUBLICATIONS

Breitkopf, D. (Aug. 18, 2006). Connecting the CRM-ATM dots. American Banker Retrieved from https://dialog.proquest.com/professional/docview/249885945?accountid=131444 on Feb. 23, 2023 (Year: 2006).*

Smith, M. (2001). Screen savings. Bank Systems & Technology, 38(1), S5-S7. Retrieved from https://dialog.proquest.com/professional/docview/213199494?accountid=131444 on Feb. 23, 2023 (Year: 2001).*

Topol et al., Integrating Direct Marketing into Financial Services: Strategic Approaches, Journal of Direct Marketing, vol. 4, Issue 4, 1990, pp. 36-45, 10 pages.

Wells fargo completes nevada account conversions; former first interstate customers will now have wells fargo account and services. (Oct. 10, 1996). Business Wire Retrieved from https://dialog.proquest.com/professional/docview/1053040133?accountid=131444 on Mar. 2, 2021 (Year: 1996).

* cited by examiner

METHODS AND SYSTEM FOR PROVIDING ATM NON-CUSTOMER LEAD INFORMATION

CROSS-REFERENCE TO RELATED APPLICATION

The present application is a continuation of U.S. patent application Ser. No. 14/305,612 entitled "METHODS AND SYSTEM FOR PROVIDING ATM NON-CUSTOMER LEAD INFORMATION," filed Jun. 16, 2014, the contents of which is hereby incorporated by reference in its entirety and for all purposes.

BACKGROUND

Automated teller machines (ATMs) are widely used throughout the world to offer financial services in convenient locations. ATMs provide a variety of secure financial services without the assistance of a human teller. For example, available financial services may include depositing, withdrawing, or transferring funds, exchanging currency, selecting and viewing account balances, statements, or credit limits, purchasing items such as stamps or gift cards, managing accounts and profiles, etc. Some financial services available at ATMs may be limited to customers of a financial institution that owns an ATM, wherein other services, such as withdrawing funds from a financial account, may also be available to non-customers. Thus, the ATM serves as an interaction point between a financial institution and both customers and non-customers.

SUMMARY

One example embodiment of the disclosure describes a method for providing non-customer lead information. The method includes displaying an initial screen on an ATM operated by a financial institution. The method may include authenticating the user at the ATM and determining that the user is a non-customer of the financial institution. The method further includes presenting an offer to the user on the ATM and receiving a response from the user relating to the offer presented. The response contains lead information provided by the non-customer. Additionally, the method may include transferring the response containing the non-customer lead information to the financial institution computing system. The information may be used, for example, to send additional information to the user, to open an account for the user, or for other purposes.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION OF EXAMPLE EMBODIMENTS

The systems and methods described provide a mechanism for using automated teller machines (ATMs) to obtain information about potential new account holders and for using the information to provide offers and to enroll the new account holders at a financial institution. The ATMs may obtain the information during a transaction at an ATM. The potential new account holder may be a user that does not currently have an account at the financial institution and that is using a non-native card or other device to access the ATM. Subsequently, the financial institution that owns the ATM may use the information to extend offers to the potential new account holder and, in some cases, to enroll the person as a new account holder of the financial institution.

Figure 1:
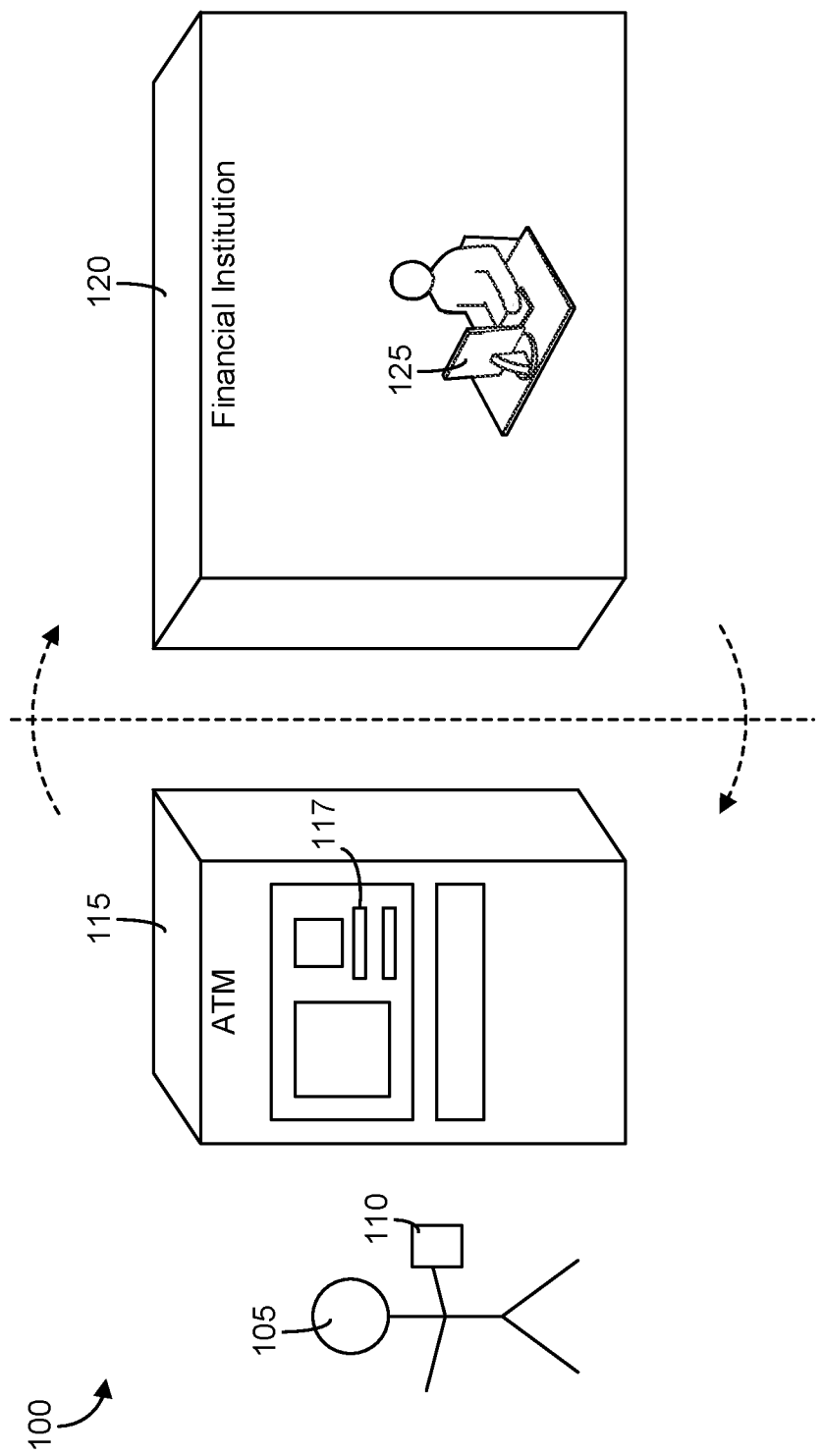
FIG. 1 is a perspective view of a system used to obtain non-customer ATM leads according to an example embodiment.

Referring to FIG. 1, a perspective view of a system used to obtain leads about potential new account holders using an ATM according to an example embodiment is shown. A non-customer user 105 is shown standing at an ATM 115 preparing to engage in a transaction. The ATM 115 may be owned and/or operated by a financial institution 120 such as a bank or credit union. The non-customer user 105 may hold an account at a financial institution different than the financial institution 120 owning the ATM 115. The user is a "non-customer" user in that the user does not currently hold any accounts at the financial institution 120 but, rather, is accessing the ATM using a non-native card or other device. The card or other device is "non-native" in the sense that it is issued or otherwise configured by a different financial institution than the financial institution 120 that owns the ATM 115. For purposes of providing an example, it will be assumed herein that the user access the ATM 115 with an ATM card. It will be appreciated, however, that the user may also access the ATM 115 with other devices, such as a mobile phone or other portable computing device. The financial institution that issued the non-native card is sometimes referred to herein as the "home" financial institution of the user. It will be appreciated, however, that the user may have accounts at more than one financial institution.

The ATM 115 may be connected to a secure computer network of the financial institution 120. The financial institution 120 may have additional computer systems that are connected (e.g., via an interbank network) to other financial institutions, such as the financial institution where the user holds one or more accounts associated with the non-native card. The user 105 may access the ATM to withdraw cash via a currency dispenser 117. As other examples, the user 105 may also access other transaction-based services such as depositing, withdrawing, or transferring funds, exchanging currency, selecting and viewing account balances, purchasing items such as stamps or gift cards, etc. Upon interacting with the ATM 115, the user 105 may enter information into the ATM 115, and the information may be transferred to a financial institution computing system 125.

Figure 2B:
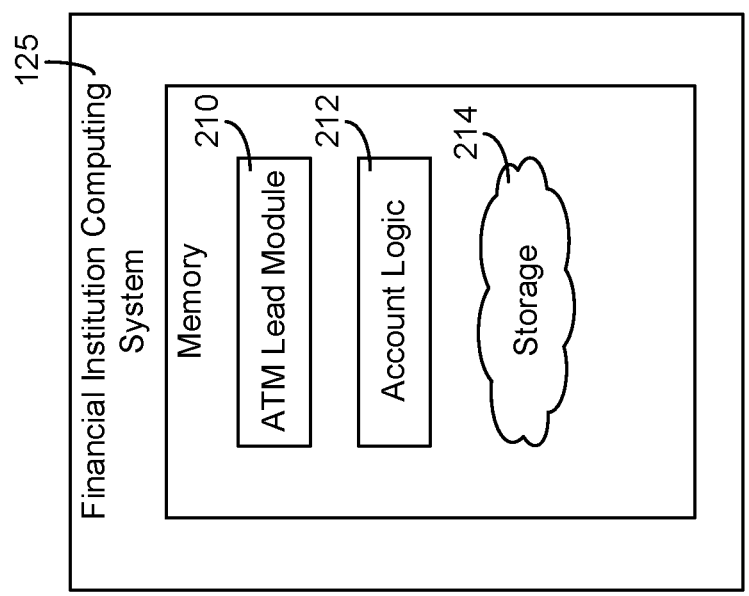
FIG. 2B is a schematic diagram of a financial institution computing system according to an example embodiment.
Figure 2A:
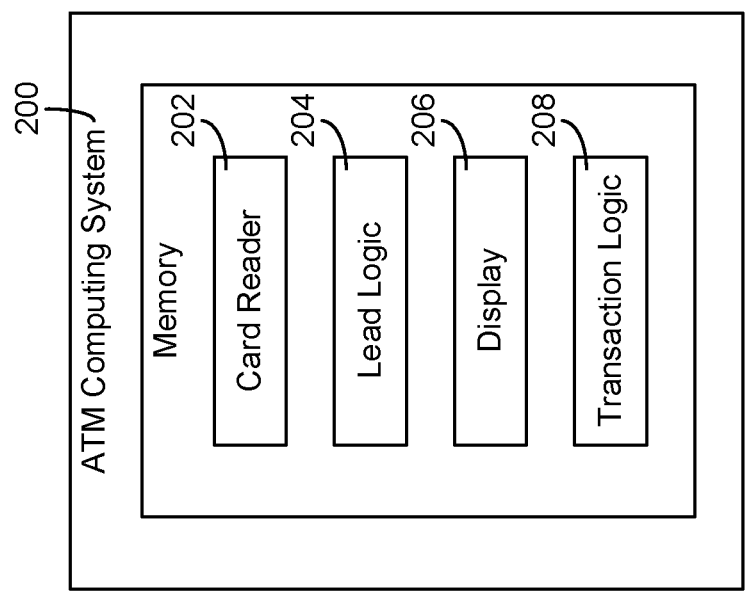
FIG. 2A is a schematic diagram of an ATM used in obtaining non-customer leads according to an example embodiment.

Referring to FIG. 2A, a schematic diagram of an ATM 115 used in obtaining user leads is shown. The ATM 115 may contain an ATM computing system 200, which may include a processor configured to execute instructions stored in memory to perform the methods and processes discussed throughout the disclosure. The ATM computing system 200 may comprise memory, a card reader 202, lead logic 204, a display 206, and transaction logic 208. Within the memory of the ATM computing system 200, the card reader 202 module may comprise a set of instructions executable by a processor to read the information from the ATM card 110. The card reader 202 may read track 1 data and/or track 2 data from an ATM card 110 pursuant to ISO 7811 and ISO 8583. Track 1 data comprises a written code that may be found on payment cards using magnetic strip technology. This data may include a format code, primary account number, name, expiration date, service code, pin verification key or value, card verification value or code, etc. Track 2 data is a format of payment card information developed by the banking industry. This data may also include a primary account number, expiration date, service code, pin verification value, card verification value or codes, etc. Track 2 data may differ from track 1 data by the bit-scheme used, thus allowing for a particular number and sequence of digits and characters to be selected. The card reader module may also read information from "smart" payment cards utilizing chips or integrated circuits, which include memory cards and microprocessing cards.

Lead logic 204 may be disposed within memory and executable by a processor to facilitate the selection and presentation and communication of offers to users 105. The lead logic 204 at the ATM 115 may cooperate with lead logic 210 at the financial institution computing system 125 to facilitate the selection and presentation and communication of offers to users 105. As will be appreciated, the extent to which operations are performed by the lead logic 204 at the ATM 115 as compared to the extent to which operations are performed by the lead logic 210 at the financial institution computing system 125 may vary in accordance with varying embodiments. As will also be appreciated, the extent to which operations are performed by the lead logic 204 at the ATM 115 and/or by the lead logic 210 at the financial institution computing system 125 as compared to the extent to which operations are performed by human representatives of the financial institution 120 may also vary in accordance with varying embodiments.

The lead logic 204 may present offers to users through the ATM computing system 200. Offers may comprise communication with a user 105 through the ATM 115 that invites the user 105 to give additional information about the user 105 to the financial institution 120. Offers may also comprise communication with a user 105 that offers the user 105 an opportunity to receive information, such as receiving information about a financial institution 120, a product created the financial institution 120, etc. As discussed below, the content of offers may vary.

The information that a user 105 provides in response to an offer may be considered lead information. The lead information may be any information that may be used to provide information to potential new customers and/or to attract the potential new customers to open an account at the financial institution 120. For example, lead information may include phone numbers, email addresses, names, opinions, etc. Lead information may also include referrals, survey information, satisfaction ratings, suggestions, etc. Lead information may be sent to the financial institution computing system 125. The presentation of the offer may be determined and executed by the lead logic 204. For example, an offer may be presented on a screen shown after information from the ATM card 110 is retrieved. In another embodiment, the lead logic 204 may present an offer to a user at the end of the transaction. The lead logic 204 may use a variety of data to determine when to present the offer. For example, the lead logic 204 may prevent offers for users 105 from being presented during particular times of the day, e.g., during known peak periods of ATM usage. The lead logic 204 may be configured to present the offer to the user 105 based on instructions from the financial institution computing system 125, based on the identity of the home financial institution of the user 105, based on the location of the ATM 115, etc.

The lead logic 204 may also communicate with modules and logic within the financial institution computing system 125 to determine the content of the offers presented to a user 105. For example, the lead logic 204 may receive information from financial institution computing system 125 indicating that the user 105 currently using the ATM 115 has previously visited the ATM 115. In some embodiments, the information received from the ATM 115 may reveal the amount and frequency of visits to the ATM 115 by the user 105, the time of day of the visits, the transaction completed at the ATM 115 visit (e.g., to check balance, withdraw funds, purchase stamps), ATM fees likely to have been charged to the user by the home financial institution of the user over time, etc. The details of previous transactions may also be received and leveraged by the lead logic 204, for example, the amount of funds withdrawn, the type of account from which the funds are withdrawn, etc.

The content of offers may be determined by the lead logic 204 at the ATM 115, the lead logic 210 at the financial institution computing system 125, or any combination thereof. For example, an offer may invite a user 105 to enter a phone number to receive a call regarding an advertisement or banking product. The offer may also include a comparison of statistics or other information related to the home financial institution of the user 105 with that of the financial institution 120 operating the ATM 115. In various embodiments, the home financial institution of the user 105 may be determined based on the issuer identification number (IIN, sometimes also referred to as a bank identification number (BIN)) extracted from the Track 1/Track 2 data on the magnetic strip of the card. Such comparison may include a comparison of interest rates attached to savings and checking accounts, CD rates, projected fee savings, rewards comparison, a comparison of location and operation hours of branches and ATMs, etc. Lead logic 204 may also compare loans products such as personal loans, business loans, home loans, and education loans.

With a comparison type offer, the lead logic 204 may present to the user 105 an option to receive marketing literature or a phone call regarding further comparisons between financial institutions. The user 105 may be offered an opportunity to come into a nearby location to meet with onsite personnel, which may be a preferable option for users who prefer human interaction with regard to banking matters. In some embodiments, the content of the offer may include a plurality of response options that a user 105 may select on an interface communicatively coupled to the ATM 115. For example, for an offer that invites the user 105 to receive more information regarding a loan product, a user 105 may be offered the opportunity to receive the loan information by email, to receive a phone call about the information, and/or to set up an appointment to discuss the loan product. The user 105 may be allowed to receive a phone call on a mobile device immediately, receive an SMS text, and/or to connect with the financial institution's online chat service. The user 105 may also be offered the opportunity to sign up for an account online, over the phone, at a local branch of the financial institution 120, etc. In some embodiments, the user 105 may select a time to meet and/or receive email communication regarding an opportunity or offer presented in the offer. The offer may also provide a user 105 with the option to receive the customer's receipt by email, text messaging, social networking messaging, picture snap mobile applications, etc. In some embodiments, the user may direct the ATM computing system 200 to send the receipt to a plurality of email addresses, wherein the screen displaying the offer may contain a field that accepts the plurality of email addresses. In yet another embodiment, the user may only be allowed to enter one email address to which a receipt would be sent.

The ATM computing system 200 may include a display located on the ATM 115 used to show the offers to a user 105. The display 206 may employ touch screen technology, such that a user of the display may engage the screen (i.e., touch the screen) with an object to interact with the display 206. Such interaction may allow the user to make selections for services, enter the amount of funds being withdrawn or deposited, or enter further information about the user 105. Thus, the display 206 may serve as an interface through which the user 105 receives and provides information to the ATM computing system 200. A display 206 of the ATM 115 may use touch screens that employ a variety of touch sensing technologies. For example, the display may have a touch screen that employs resistive technology, surface acoustic wave technology, capacitive technology, etc. In one embodiment, the display 206 may aid in authorizing or identifying a user 105 using biometric means, such as fingerprint, eye scan, or face recognition.

The transaction logic 208 may facilitate transactions between the ATM 115 and users of the ATM 115 (both customers and non-customers). The transaction logic 208 processes the transactions over a banking network and may be configured to communicate with the financial institution computing system 125 to execute the transactions. For example, in a withdrawal transaction, the transaction logic 208 may communicate with the financial institution computing system 125 to determine if the user 105 has the requested amount of funds available in the user's respective financial account. The transaction logic 208 alerts the user 105 if the proposed transaction would cause an overdraft. The transaction logic 208 may also facilitate transactions such as depositing, or transferring funds, exchanging currency, selecting and viewing account balances, statements, or credit limits, purchasing items such as stamps or gift cards, etc. Some of the transactions facilitated by the transaction logic 208 may be restricted from particular users of an ATM 115. For example, the transaction logic 208 may restrict the ability of a non-customer user to exchange currency at an ATM 115 while allowing the capability for customers to do the same. Determining which transactional features are available to the user 105 may be accomplished by the transaction logic 208. Additionally, the transaction logic 208 may determine whether to reject certain ATM cards if the cards have a status such as stolen, lost, inactive, etc.

FIG. 2B is a schematic diagram of a financial institution computing system 125 according to an example embodiment. The financial institution computing system 125 may operate within the financial institution 120. The financial institution computing system 125 may contain ATM lead logic or lead module 210, account logic 212, and storage 214. (Herein, the terms "module" and "logic": are used interchangeably.) The ATM lead module 210 may receive lead information sent from the ATM computing system 200. The ATM lead module 210 may communicate with the lead logic 204 to receive lead information from users 105 entered through the display 206 or other user interface of the ATM computing system 200. In some situations, e.g., where the user 105 has requested to be contacted by a human representative, the ATM lead module 210 may also present lead information received from the lead logic 204 on a display to an agent or prospector (e.g., banker, teller, manager, employee) of the financial institution 120. The agent of the financial institution 120 may manipulate or interact with the lead information through the ATM lead module 210 on a device.

The ATM lead module 210 may access the storage 214 within the financial institution 120 to determine previous lead information captured from a user 105. The stored lead information may be used to develop offers to present to users 105 at the ATM 115. For example, if the ATM 115 is frequently visited by the user 105, the lead logic 204 and ATM lead module 210 may capture and store information for each visit by the user 105 based upon information read from the ATM card 110 or information entered into the ATM 115 by the user 105. A user 105 may receive varying offers with each visit, wherein each offer may offer the user 105 an opportunity to provide more information, such that a profile of the user 105 may be built up over time. For example, upon an initial visit at an ATM 115, the lead logic 204 may offer the user 105 an opportunity to receive a phone call regarding a featured product (e.g., a checking account). Upon a second visit to the ATM 115 by the user 105, the lead logic 204 may make an offer extending an opportunity for the user 105 receive information regarding the featured product by email or to receive a transaction receipt by email. If a customer takes advantage of both offers, the ATM lead module 210 collects lead information from the user 105 comprising a telephone number and an email address. The ATM lead module 210 may determine information previously received from the user 105 and communicate to the lead logic 204 regarding currently obtained lead information. The lead logic 204 may receive the lead information from the ATM lead module 210 and present offers to the user 105 based on the previously received lead information.

The account logic 212 may manage and facilitate transactions with financial accounts held at the financial institution 120. The account logic 212 may specifically monitor and manage the accounts of customers of the financial institution 120. Customer account information may be maintained separately from information from the user 105. If the user of the ATM 115 is identified as a non-customer, then the communication by the ATM computing system 200 with the financial institution computing system 125 may be performed in part by the ATM lead module 210. In some embodiments, the ATM lead module 210 may use various information from the account logic 212 in determining the content of offers. For example, the ATM lead module may use statistics regarding the number of customers, satisfaction of customers, popularity of products, etc., to be used, for instance, in a comparison type offer. The account logic 212 may also perform account processing to process transactions associated with the financial accounts. Such transactions may include crediting, debiting, transferring funds, checking and updating balances, maintaining account statements, etc.

The financial institution computing system 125 may contain a data storage system 214 capable of storing information related to both customers and on-customers. The storage system 214 may receive information relating to both customers and non-customers of the financial institution 120 from ATM lead module 210 or account logic 212. The information may include account transaction information, such as deposits, withdrawals, and so on. The storage system 214 also stores information from the ATM computing system 200, including lead information transferred by lead logic 204 to the financial institution computing system 125.

Figure 3:
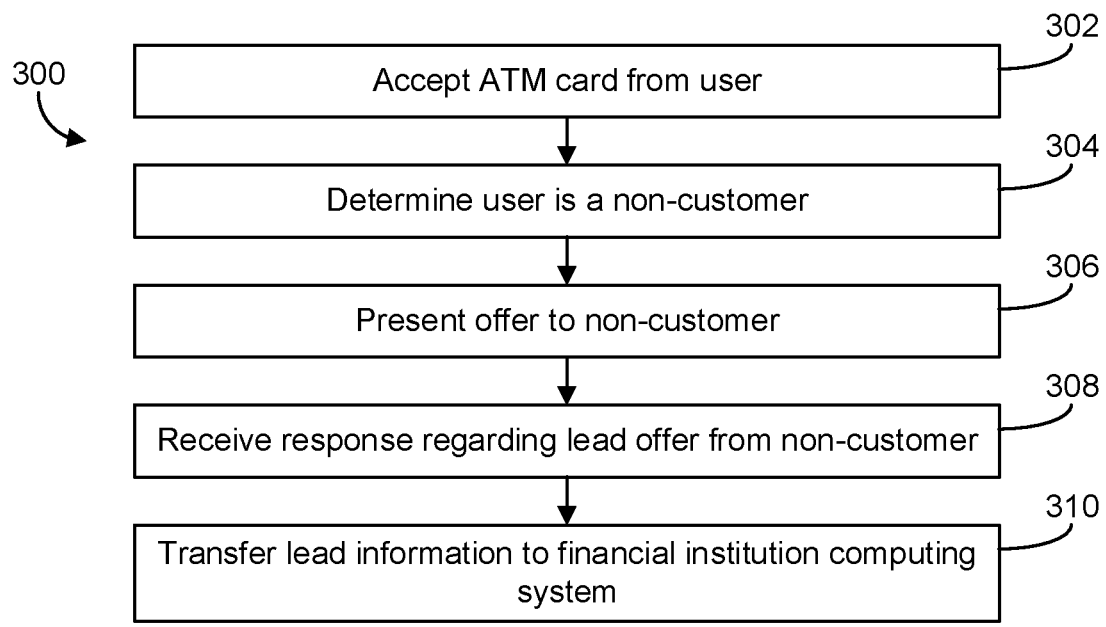
FIG. 3 is a flow diagram of a method for providing ATM non-customer leads according to the system of FIG. 1.

FIG. 3 is a flow diagram of a method for obtaining ATM user lead information according to the system of FIG. 1. The method of FIG. 3 may be performed by the ATM 115 (including the ATM computing system 200). The method may involve accepting an ATM card 110 from a user of the ATM 115 (302). Information may be read off of ATM cards employing a magnetic stripe by swiping the card past a magnetic reading device. According to one embodiment, the card reader 202 within the ATM 115 has a magnetic reading device capable of receiving an ATM card 110 having information stored within the magnetic stripe. The ATM card 110 may be inserted into the ATM 115 by the user, and the card reader 202 may receive the ATM card 110 by accepting the entire physical card within the body of the ATM 115 or by accepting a part of the ATM card 110 within the body of the ATM 115. The ATM card 110 may also implement "smart" technology, which involves using an integrated circuit to store card information. Some "smart" ATM 115 cards may require electrical connection with a card reader in order to read information from the card. Other "smart" cards may employ contactless technology (e.g., a magnetic field or radio frequency) to allow for the card to be read within a proximity. In other embodiments, ATM cards 110 implement any combination of magnetic stripe technology, smart chip technology, pin technology, and radio frequency technology. In some embodiments, the ATM 115 is configured to read data from the ATM card 110 by scanning the ATM card 110 or retrieving information from the ATM card 110 without requiring the insertion of the ATM card 110 into the ATM 115. In other embodiments, rather than accessing an ATM card of the user, the ATM 115 may wirelessly access a mobile device of the user to authenticate the user and/or receive other transaction information.

Obtaining lead information may involve determining that the user of the ATM 115 is not a customer of the financial institution (304). The ATM computing system 200 determines whether a user 105 is a non-customer based on information read from the ATM card 110 presented by the user. The ATM card 110 may contain track 1 and/or track 2 data discussed above, which may include the name of the cardholder and a bank or issuer identification number (BIN/IIN). In some embodiments, the user is classified as a non-customer if the user is using an ATM card 110 that is associated with a financial account at a separate financial institution, regardless of whether the user holds a financial account at the financial institution hosting the ATM 115. In yet another embodiment, the ATM computing system 200 communicates with the financial institution computing system 125 to determine whether a user categorized as a user 105 based on the received ATM card 110 currently holds or has previously held a financial account at the financial institution 120.

Figure 4:
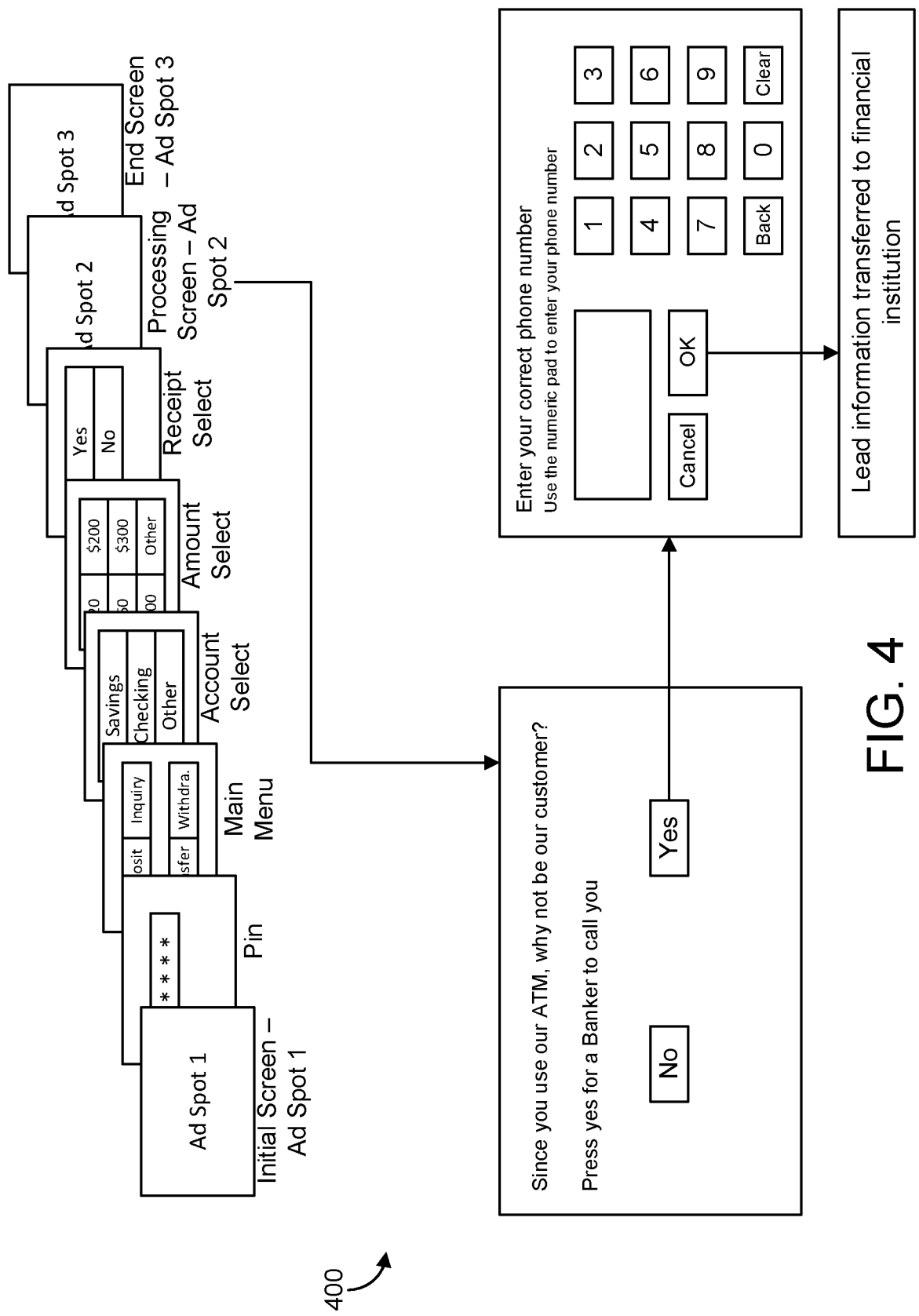
FIG. 4 is a schematic flow diagram of a sample customer lead flow according to an example embodiment.

The method of FIG. 3 may include presenting an offer to user 105 (306). An offer invites the user 105 to give additional information (i.e., lead information) about the user 105 to the financial institution 120 operating the ATM 115. Offers may also culminate in active steps being taken by a financial institution 120 to fulfill the substance or content of an offer. The content of the offers may vary based upon the type of information that the financial institution 120 seeks to capture. The offer may vary in content based on a variety of factors, including the card data, data received from the user 105, promotion directives for a financial institution computing system 125, the location of the ATM 115, the frequency and extent of the utilization by the user 105 of the ATM 115, stored information in the financial institution computing system 125 storage, etc. An offer may offer the user 105 the opportunity to make an appointment with a representative of the financial institution 120 through the ATM 115. If a user 105 accepts the offer on the display 206 of an ATM 115, the financial institution computing system 125 and/or agent of the financial institution computing system may execute the content of the offer as accepted by the user 105. Offers may be targeted to the user 105 to obtain additional information from the user 105. For example, the ATM computing system 200 may determine that the user 105 was a previous customer of the financial institution 120, and the offer may include a message relaying that the financial institution 120 wants the user 105 back as a customer. In another example, the offer seeks to receive feedback regarding the satisfaction of the user 105 with the user's experience at the ATM 115. If the system also determines that the user 105 holds an account with the financial institution 120 that is currently not being used at the ATM 115, the offer may ask the user 105 to give information regarding the user's 105 transactional choices. The offer may be presented to the user 105 according to a variety of implementations. For example, the offer may be presented to a customer as a splash screen, banner, a content slot with varying shapes and sizes, bubble text wrap, images, etc. Offers may also be presented at a number of ATM 115 screen flow positions, from the initial screen to the end screen. FIG. 4, described further below, shows an example of a flow screen and ad slots where offers may be presented to the user 105. The presentation of offers in a variety of screen flow positions is discussed in greater detail below in connection with the discussion of FIG. 4.

The method of obtaining lead information includes receiving a response regarding the offer from user 105 (308). After an offer is presented to the user 105, the user 105 may opt into the offer or choose to bypass the offer. A screen may appear on the display 206 of an ATM 115 that allows the user 105 to indicate a desire to receive information regarding the offer or refuse the offer, whereby a user 105 would engage the appropriate selection to either accept or deny. As mentioned above, a customer may enter this information on a display 206 located on the ATM 115. The display may be enabled with touch screen technology that allows the user 105 to interact with the ATM 115 through the display 206. In other embodiments, the ATM 115 may contain a key pad that allows a customer to press keys to enter information into to ATM computing system 200. In yet another embodiment, the ATM 115 may be equipped with audio visual cameras, vocal recorders, and motion sensors to capture offer responses involving pictorial/video graphical imagery, vocal recordings, or motion information. In other embodiments, a mobile device of the user 105 may be utilized in interacting with the user 105 at the ATM 115.

The method may include transferring lead information to the financial institution computing system 125 (310). The information that the user 105 inputs into the ATM computing system 200 in response to an offer comprises lead information. The lead information may be received in a variety of formats based upon the interface used by the user 105 to enter the information in providing a response. For example, the information for may be alphanumeric, a vocal recording, etc. The ATM computing system 200 may receive the information in its format and transfer the information to the financial institution computing system 125.

FIG. 4 is a schematic flow diagram of a sample customer flow according to an example embodiment. The screen flow shows a plurality of screens that may be shown on a display

206 of an ATM 115. While there may be any number of screens or steps throughout an ATM 115 transaction process, FIG. 4 shows a flow of eight screen shots. The first screen shot displays an initial screen that a user views upon approaching the ATM 115. The initial screen may include the logo of the financial institution 120 hosting or operating the ATM 115 along with contact information. The initial screen may also include instructions regarding how a user begins a transaction, for example, "insert/swipe/scan card here". The instructions may also direct a user regarding how to get authenticated in another manner (e.g., using a mobile phone). The initial screen may pass once the ATM computing system 200 receives the users' card and determines that the user is a non-customer.

After a user 105 surpasses the initial screen by transferring card information to the ATM computing system 200, the second screen may prompt the user 105 to enter a pin. The pin may be a short series of digits or characters that serves to authenticate a cardholder. The third screen may present a main menu that allows a user 105 to select which transaction the user 105 wishes to execute. For example, the main menu may present options to withdraw funds, deposit funds, transfer funds, perform a balance inquiry, etc. The ATM computing system 200 may be connected with to financial institution computing system 125, which may in turn be connected to a banking network that allows the ATM computing system 200 access to the financial accounts of the user 105 at a separate financial institution to complete the ATM 115 transaction. The main menu may have a reduced number of transaction options as would otherwise be available to customer of the financial institution. The fourth screen presented to a user 105 may allow a user 105 to select which account (e.g., savings, checking, other) the user 105 wishes to use to execute a transaction. The fifth screen may allow the user 105 to select the amount of transaction in connection with the previously selected account. The amount selection screen may offer the selection of specific dollar amounts, or the ATM 115 may allow the customer to enter a specific amount. In some examples, the customer may only be allowed to enter a dollar amount in multiples of 20. The non-customer user 105 may have a lower daily withdrawal limit from an ATM 115 than a customer of the financial institution 120 operation the ATM 115. Thus, if the user 105 enters a value higher than the allowed limit, then the ATM 115 may display a screen informing the user 105 that the amount selected is invalid.

The sixth screen may allow the user 105 to choose whether the ATM 115 will print a receipt at the end of the transaction. The user 105 may choose yes or no through any interface available at the ATM 115. The seventh screen is an intervening processing screen that appears when the ATM computing system 200 is processing the transaction. A general message may appear to tell the user 105 that the transaction is currently being processed. In some embodiments, the idle time may be used to obtain additional lead information from the user 105. The end screen may be displayed once the transaction is complete. The end screen may instruct the user 105 to retrieve the cash, retrieve the receipt, and/or remove the ATM card 110. The flow of the screens may be controlled by user input or may be timed according settings within the ATM computing system 200.

Ad slots may be placed on any screen and may host offers tied to the financial institution 120 according to one example. FIG. 4 displays at total of three ad spots that may display offers: one on the initial screen (first screen), one on the processing screen (seventh screen), and one on the end of transaction screen (eighth screen). FIG. 4 further describes an example screen flow from an ad slot. At ad slot 2, the ATM 115 displays an offer to the user 105 to become a customer of the financial institution 120. The offer also provides the user 105 an option to be called by a banker regarding the offer to become a customer. The user 105 may positively respond to the offer to be called by a banker by engaging the field on the display that indicates the user 105 would like to receive a call. The offer screen may also contain a disclaimer, for example, that notifies the user 105 that by entering the phone number, the user 105 is providing express consent to be called by a banker for a specific purpose. The user 105 may decline the offer by engaging a field on the display that indicates the user's 105 disinterest in the offer.

If the user 105 chooses to take advantage of the offer, the user may then be prompted to enter information (i.e., lead information) into the ATM computing system 200. The display 206 may show a screen that provides the user 105 instructions regarding how to submit the lead information. For example, the ATM computing system 200 may instruct the user 105 to enter a correct phone number. The ATM computing system 200 may also provide a mechanism, such as a keypad, that allows the user 105 to enter the lead information. A field is provided to allow the user 105 to view the lead information as the information is entered through a mechanism such as a keypad. Once the lead information is entered, the user 105 may submit the information by engaging a button on the screen. The user 105 may also cancel the process of submitting lead information by engaging a button that cancels the information transfer process. Once the user 105 engages the button that submits the lead information, the ATM computing system 200, via the lead logic 204, processes the lead information and transfers the lead information to the financial institution computing system 125. The financial institution computing system 125 may receive the lead information and leverage the lead information accordingly to provide information and service to the user 105. The ATM computing system 200 may be configured to process and transmit the lead information submitted by the user 105 on a real-time basis or the lead information may be submitted periodically (e.g., overnight processing).

Figure 5:
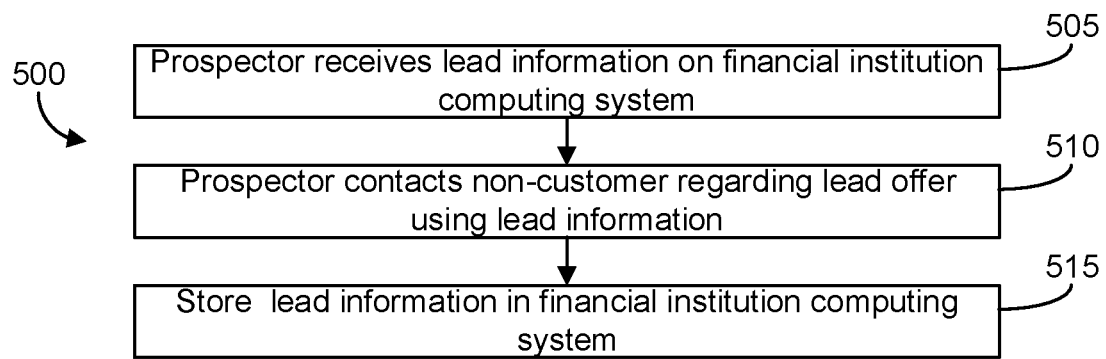
FIG. 5 is a flow diagram of a method for receiving ATM non-customer leads according to an example embodiment.

FIG. 5 shows a flow diagram of a method for obtaining ATM user leads according to an example embodiment. The method may involve using a financial institution computing system 125, wherein a prospector may receive lead information on the financial institution computing system 125 (505). The prospector may also be program logic in the financial institution computing system 125 and/or the ATM computing system 200. The prospector may be an agent of a financial institution 120, for example a banker, a teller, a branch manager, etc. In some examples, an agent may be a third party who has offers displayed in ad slots of the ATM 115 through the processing flow. For example, a car company may present an offer through an ad slot offering the user 105 an opportunity to receive a call from the car company regarding a sale. The financial institution 120 may transfer the lead information to the third party (e.g., car company). As another example, the user 105 may be offered a benefit by the third party (e.g., a free gift, a free cup of coffee, a free meal, etc.) in exchange for providing lead information at the ATM 115. For example, the user 105 may provide an email address which may be used to receive a free coupon for the benefit, and may further consent to being contacted at the email address to receive marketing information from the financial institution 120.

The prospector may contact the user 105 regarding the offer using lead information (510). The prospector may contact the user 105 to follow up on the offer presented at the ATM 115 that prompted the user 105 to provide the lead information. For example, if the user 105 positively responds to an offer that offers the user 105 the opportunity to receive a thorough comparison of services by email, then the prospector may contact the user 105 through the provided email giving the user 105 a comparison of services. In some embodiments, the contact by the prospector with the user 105 may respond to the offer and present another offer (e.g., the email may display a comparison of services by offer the user 105 the opportunity to receive text messages regarding new services offered by financial institution 120. In some examples, the prospector may only contact the user 105 in the manner indicated by the user 105 using the lead information provided by the user 105 and solely for the purpose specified in the offer.

The prospector may store user 105 lead information in financial institution computing system 125 (515). The lead information may be stored separately from customer account information within the financial institution computing system 125. The prospector may also store additional information obtained from pursuing the lead information and contacting the user 105 regarding the offer. For example, if the user 105 opts into a lead to be called by a banker regarding opening a bank account and the user 105 gives the banker additional information (e.g., an email address or home address), the banker may store the related user 105 information in the storage system 214 of the financial institution computing system 125. The information may be retrieved from the storage system 214 for a variety of reasons, including for viewing, analysis, for creating new offers for returning or new user 105 ATM 115 users, etc.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. configured to perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the disclosure's operating conditions and arrangement of the embodiments without departing from the scope of the present invention.

What is claimed is:

1. A method for obtaining non-customer lead information comprising:
   authenticating a user at an automated teller machine (ATM) for a transaction via biometric information, the ATM being connected to a computing system of the financial institution;
   determining, by lead circuitry, that the user is a non-customer of the financial institution operating the ATM;
   determining, responsive to the determination that the user is a non-customer of the financial institution operating the ATM, that the user was a customer of the financial institution prior to becoming a non-customer;
   restricting, responsive to the determination that the user is the non-customer of the financial institution operating the ATM, features available to the user at the ATM;
   presenting, by the lead circuitry while the transaction is currently being processed, an offer to the non-customer on the ATM by displaying information related to the offer on a screen on the ATM, the offer based in part on the non-customer lead information collected from an at least one previous transaction with the user and stored in the data storage system,
      wherein the offer comprises a first type of offer in response to determining that the non-customer is using the ATM on a first visit, and wherein the offer comprises a second type of offer in response to determining that the non-customer is using the ATM on a second visit, and wherein, responsive to the determination that the user was a customer of the financial institution operating the ATM prior to becoming a non-customer, the offer further comprises a message to the user indicative of the user being a former customer;
   receiving, by transaction circuitry using a user interactive element of the screen, a response from the non-customer relating to the offer presented, wherein the response contains non-customer lead information provided by the non-customer; and
   transferring, by the transaction circuitry, the response containing the non-customer lead information to the financial institution computing system.

2. The method of claim 1, wherein the financial institution computing system contains memory having logic disposed therein, the logic being executable by a processor to perform operations including:
   receiving the non-customer lead information from the ATM computing system communicatively coupled to the ATM;
   contacting the non-customer regarding the offer using non-customer lead information; and
   storing the non-customer lead information in the financial institution computing system storage for a period of time.

3. The method of claim 2, further comprising opening an account for the user using the lead information.

4. The method of claim 1, wherein the non-customer lead information comprises a phone number entered by the non-customer in response to the offer.

5. The method of claim 1, wherein the non-customer lead information comprises an email address entered by the non-customer in response to the offer, wherein the offer offers the non-customer an option to receive a transaction receipt from the ATM computing system by email.

6. The method of claim 1, further comprising sending the user marketing information using the lead information obtained from the user.

7. The method of claim 1, wherein the offer is presented to the non-customer on the ATM based on data stored in the financial institution computing system including visit history.

8. A system comprising:
   a processor; and
   a non-transitory machine readable medium with instructions stored thereon that, when executed by the processor, cause the system to:
   authenticate a user at an automated teller machine (ATM) for a transaction via biometric information, the ATM being connected to a computing system of the financial institution;
   determine that the user is a non-customer of the financial institution operating the ATM;
   determine, responsive to the determination that the user is a non-customer of the financial institution operating the ATM, that the user was a customer of the financial institution prior to becoming a non-customer;
   restrict, responsive to the determination that the user is the non-customer of the financial institution operating the ATM, features available to the user at the ATM;
   present, while the transaction is currently being processed, an offer to the non-customer on the ATM by displaying information related to the offer on a screen on the ATM, the offer based in part on the non-customer lead information collected from an at least one previous transaction with the user and stored in the data storage system,
      wherein the offer comprises a first type of offer in response to determining that the non-customer is using the ATM on a first visit, and wherein the offer comprises a second type of offer in response to determining that the non-customer is using the ATM on a second visit, and wherein, responsive to the determination that the user was a customer of the financial institution operating the ATM prior to becoming a non-customer, the offer further comprises a message to the user indicative of the user being a former customer;
   receive, using a user interactive element of the screen, a response from the non-customer relating to the offer presented, wherein the response contains non-customer lead information provided by the non-customer; and
   transfer the response containing the non-customer lead information to the financial institution computing system.

9. The system of claim 8, wherein the instructions further cause the system to:
   receive the non-customer lead information from the ATM computing system communicatively coupled to the ATM;
   contact the non-customer regarding the offer using non-customer lead information; and store the non-customer lead information in the financial institution computing system storage for a period of time.

10. The system of claim 9, wherein the instructions further cause the system to open an account for the user using the lead information.

11. The system of claim 9, wherein the non-customer lead information comprises a phone number entered by the non-customer in response to the offer.

12. The system of claim 9, wherein the non-customer lead information comprises an email address entered by the non-customer in response to the offer, wherein the offer offers the non-customer an option to receive a transaction receipt from the ATM computing system by email.

13. The system of claim 9, wherein the instructions further cause the system to send the user marketing information using the lead information obtained from the user.

14. The system of claim 9, wherein the offer is presented to the non-customer on the ATM based on data stored in the financial institution computing system including visit history.

15. A non-transitory computer readable media having computer-executable instructions embodied therein that, when executed by a computing system, causes the computing system to perform operations comprising:
   authenticating a user at an automated teller machine (ATM) for a transaction via biometric information, the ATM being connected to a computing system of the financial institution;
   determining that the user is a non-customer of the financial institution operating the ATM;
   determining, responsive to the determination that the user is a non-customer of the financial institution operating the ATM, that the user was a customer of the financial institution prior to becoming a non-customer;
   restricting, responsive to the determination that the user is the non-customer of the financial institution operating the ATM, features available to the user at the ATM;
   presenting, while the transaction is currently being processed, an offer to the non-customer on the ATM by displaying information related to the offer on a screen on the ATM, the offer based in part on the non-customer lead information collected from an at least one previous transaction with the user and stored in the data storage system,
   wherein the offer comprises a first type of offer in response to determining that the non-customer is using the ATM on a first visit, and wherein the offer comprises a second type of offer in response to determining that the non-customer is using the ATM on a second visit, and wherein, responsive to the determination that the user was a customer of the financial institution operating the ATM prior to becoming a non-customer, the offer further comprises a message to the user indicative of the user being a former customer;
   receiving, using a user interactive element of the screen, a response from the non-customer relating to the offer presented, wherein the response contains non-customer lead information provided by the non-customer; and
   transferring the response containing the non-customer lead information to the financial institution computing system.

16. The computer-readable media of claim 15, wherein the operations further comprise:
   receiving the non-customer lead information from the ATM computing system communicatively coupled to the ATM;
   contacting the non-customer regarding the offer using non-customer lead information; and
   storing the non-customer lead information in the financial institution computing system storage for a period of time.

17. The computer-readable media of claim 16, wherein the operations further comprise opening an account for the user using the lead information.

18. The computer-readable media of claim 15, wherein the non-customer lead information comprises an email address entered by the non-customer in response to the offer, wherein the offer offers the non-customer an option to receive a transaction receipt from the ATM computing system by email.

19. The computer-readable media of claim 15, wherein the operations further comprise sending the user marketing information using the lead information obtained from the user.

20. The computer-readable media of claim 15, wherein the offer is presented to the non-customer on the ATM based on data stored in the financial institution computing system including visit history.

\* \* \* \* \*